US007230808B2

(12) United States Patent
Kirby et al.

(10) Patent No.: US 7,230,808 B2
(45) Date of Patent: Jun. 12, 2007

(54) GROUNDING OF ELECTRICAL STRUCTURES

(75) Inventors: Norman Kirby, Alvin, TX (US); Fu Tian, Conroe, TX (US); Richard C. Hannay, Conroe, TX (US); Walter Coffer, Conroe, TX (US)

(73) Assignee: Forward Ventures, LP, Arlington, TX (US)

( * ) Notice: Subject to any disclaimer, the term of this patent is extended or adjusted under 35 U.S.C. 154(b) by 470 days.

(21) Appl. No.: 10/851,839

(22) Filed: May 21, 2004

(65) Prior Publication Data

US 2005/0257946 A1 Nov. 24, 2005

(51) Int. Cl.
*H02H 3/00* (2006.01)

(52) U.S. Cl. ........................................................ 361/62

(58) Field of Classification Search ................... 361/62
See application file for complete search history.

(56) References Cited

U.S. PATENT DOCUMENTS

| | | | |
|---|---|---|---|
| 3,344,871 | A | 10/1967 | Goodman |
| 3,403,520 | A | 10/1968 | Goodman |
| 3,564,859 | A | 2/1971 | Goodman |
| 3,611,736 | A | 10/1971 | Goodman |
| 3,798,186 | A | 3/1974 | Nakade et al. |
| 3,805,532 | A | 4/1974 | Kistner |
| 3,968,657 | A | 7/1976 | Hannay |
| 4,134,862 | A | 1/1979 | Eden et al. |
| 4,299,751 | A | 11/1981 | Born |
| 4,966,497 | A | 10/1990 | Kirby |
| 5,466,094 | A | 11/1995 | Kirby et al. |
| 6,942,428 | B2 * | 9/2005 | Hannay et al. ............. 405/231 |
| 2003/0151030 | A1 | 8/2003 | Gurin |

* cited by examiner

*Primary Examiner*—Stephen W. Jackson
(74) *Attorney, Agent, or Firm*—Fulbright & Jaworski LLP

(57) ABSTRACT

Placement of a conductive polymer composition grounding material at frequent points in an integrated electric transmission and distribution system to minimize transmission of harmonics and the resulting electrical losses is described.

21 Claims, No Drawings

GROUNDING OF ELECTRICAL STRUCTURES

TECHNICAL FIELD

The present invention relates generally to an improved method of grounding of electrical structures using rigid foam polyurethane resin compositions. It more particularly relates to the improvement of the resulting electrical ground using the compositions which also permit the setting or resetting of the electrical structure.

BACKGROUND OF THE INVENTION

This invention is an improvement in the methods of setting or resetting electrical structures, while simultaneously improving the electrical grounding of the same. line protection of poles or encapsulation of pole treatment chemicals and enhancement of the strength to density ratio, of rigid foam polyurethane resins formed in-situ. The improvement resides in the use of compositions having electrical conductivity. The resulting electrical contact surface area of the pole to the earth is greatly enhanced relative to conventional grounding techniques.

The present invention is an improvement in the technology disclosed in U.S. Pat. No. 3,968,657 to Hannay, U.S. Pat. No. 5,466,094 to Kirby et al., U.S. Pat. No. 3,564,859 to Goodman, U.S. Pat. No. 3,403,520 to Goodman, and U.S. Pat. No. 4,966,497 to Kirby which describe related methods for resetting poles with foam plastic. It is also an improvement over published U.S. application No. 2003/0210959 A1 of Hannay et al, which discusses improved grounding using foam polyurethane compositions. The entire disclosures of U.S. Pat. Nos. 3,968,657, 3,564,859, 3,403,520, 4,966,497, 5,466,094, and published U.S. application No. 2003/0210959 A1 are incorporated by reference as though fully set out herein.

In brief, U.S. Pat. No. 3,403,520 describes a method of setting pole forms in the ground by making a hole which is only slightly larger than the butt of the pole to be placed in the hole, placing the pole in the hole in the desired position, partially filling the hole with a reactive component mixture with a synthetic resin and a blowing agent and permitting the reaction to complete so as to expand the resinous foam into all the space between the pole and the sides of the hole. The expanded resinous foam adheres to and seals the surface of the embedded section of the pole protecting it from moisture, chemicals and rodents and sets the pole in the hole. The expanding resinous foam fills all the voids, surfaces, crevices and notches in the sides and bottom of the hole.

U.S. Pat. No. 3,564,859 describes a procedure for straightening and refilling the hole. It utilizes the same method as U.S. Pat. No. 3,403,520 for producing foam and for filling voids resulting when an existing installed pole has been realigned after it has been canted or tilted.

U.S. Pat. No. 3,968,657 was an improvement upon the in-situ reaction chemistry used to prepare the backfill material. The '657 patent disclosed the addition of a non-volatile water-immiscible material to the mixture so that properties of the resultant product are not affected excessively in the presence of groundwater. A further improvement in the backfill-forming chemistry was described in U.S. Pat. No. 4,966,497. The '497 patent describes a procedure that is an improvement on the above methods because halogenated hydrocarbon blowing agents, more particularly chlorofluorocarbons, are not required. Further, the composition decreased the cost per unit of the polyurethane foam.

U.S. Pat. No. 5,466,094 represented another improvement pole setting or resetting compositions and methods. In the '094 patent, the polyurethane forming chemistry was modified by stabilizing the highly reactive isocyanate component by pre-reaction to form a prepolymer. Published U.S. application No. 2003/0210959 A1 describes how resetting pole compositions can be used to enhance grounding generally. However, given the proliferation of sensitive electronic circuitry of modem devices such as the personal computer, there remains a need to efficiently ground electrical structures in such a way that optimally removes harmonic components which lead to harmonic distortion.

All of the aforementioned patents are devoid of any teaching which describes a backfill composition or method which simultaneously sets or resets an electrical structure and aids in the electrical grounding of the structure. A good ground connection effectively directs the excessive current from a lightening strike to the ground. Proper grounding also helps to insure the quality of the power being transmitted by helping to eliminate or minimize voltage spikes and interference such as RF signals from adversely affecting sensitive electronic equipment.

The present invention simultaneously improves the stability and grounding of modem electrical structures and transmission lines. Electrical systems in the United States use the crust of the earth as part of the return conductor. The grounded, system neutral protects the phase conductors from excessive amperage and voltage as well as to help balance phase voltage and harmonics. Continuously grounded "static" shield wire's purpose is to get the excessive current of a lightening strike into the ground as soon as possible to avoid damage to the shielding conductors, and the buildup of excessive unbalanced voltage on the phases. Good grounding is particularly important today with the sophisticated electronic equipment currently widespread. Additionally, good grounding helps to minimize service interruptions. The need for good backfill materials to set and reset electrical line structures has been known for quite some time and good progress has been made in this area. By making any of the currently used backfill materials conductive and optimally placing such materials, the surface area "connected" to the earth can be greatly enhanced, and harmonic distortion can be significantly reduced.

For instance, the typical method of connecting to the earth is a ⅝ths inch×10 foot ground rod driven into the earth. This method has a surface area of 235 $in^2$. A 10 inch×10 inch copper plate has a surface area of 100 $in^2$. A butt wrap ground of No. 6 copper wire, 20 feet long, wrapped around the pole will give a surface area of 75 $in^2$. This is compared to the surface area of a backfill, which is an approximately 20 inch diameter hole, 6 feet deep, giving a surface area in contact with the earth of up to 4500 $in^2$ which is 19 and 60 times bigger respectively. Therefore, the electrical contact with the ground is increased. This is important in the areas of poor soil conductivity. As was discussed above, U.S. Pat. No. 4,966,497 teaches the use of using a modified urethane as a pole backfill material. By expanding the physical properties of this backfill material to include electrically conductive capabilities, the surface area and abilities of the grounding are vastly improved to include electrical ground in addition to physical grounding.

Electrical losses in transmission and distribution are proportional to the square of the current multiplied by the impedance. For this reason, it is advantageous for electrical transmission lines to operate at a high voltage, low current mode to minimize losses. Given a constant impedance, current and voltage are directly proportional; a decrease in one is compensated by a proportional increase in the other. Hence, transmission is optimally performed in a high voltage, low current mode. Prior to use, however, this must be transformed to a low voltage source as almost all equipment would be destroyed by the high voltages used in transmission. Proper grounding of the electrical transmission at optimal locations, can be used to efficiently reduce and sometimes eliminate harmonic components which lead to harmonic distortion. Grounding is an important "safety valve" of an electrical system, protecting both the system and persons working on the system. Proper grounding is important for a number of reasons. All electrical equipment requires grounding because of possible short circuits within the system. Electrical sensors, such as relays require a reference, which is oftentimes ground. Harmonics created by semiconductor equipment and unbalanced loads depend upon good ground to stabilize the system. The standard AC system in the U.S. operates at 60 cycles/second (Hz). Harmonics are additional cycles superimposed on the 60 Hz cycle curve. The total load comprises the basic sine wave of the expected system load plus the harmonics generated, resulting in a much larger total than the expected load. Harmonics are oftentimes caused by unbalanced loads; such as produced by single phase motors, temporary faults on the line or equipment and by the use of semiconductors, etc. Harmonics can be reduced substantially by a strong ground as close to the load as possible.

BRIEF SUMMARY OF THE INVENTION

The present invention is directed to a method of grounding structures in integrated electrical transmission and distribution systems. Some embodiments of the invention follow.

In one embodiment of the present invention, there is a method of grounding integrated electrical transmission and distribution systems comprising the step of providing a ground contact area of at least 750 $in^2$ using a conductive polymer composition at one or more transformer structures in the distribution system. In one embodiment, the method further comprises the step of providing a ground contact area of at least 750 $in^2$ using a conductive polymer composition at one or more primary switch structures in the distribution system. In one embodiment, the method further comprises the step of providing a ground contact area of at least 750 $in^2$ using a conductive polymer composition at one or more primary metering structures in the distribution system. In one embodiment, the method further comprises the step of providing a ground contact area of at least 750 $in^2$ using a conductive polymer composition at one or more lightening arrestor structures in the distribution system. In one embodiment, the method further comprises the step of providing a ground contact area of at least 750 $in^2$ using a conductive polymer composition at one or more capacitor bank structures in the distribution system. In one embodiment, the method further comprises the step of providing a ground contact area of at least 750 $in^2$ using a conductive polymer composition at one or more relay structures in the distribution system. In one embodiment, the method further comprises the step of providing a ground contact area of at least 750 $in^2$ using a conductive polymer composition at one or more automatic switch structures in the distribution system. In one embodiment, the method further comprises the step of providing a ground contact area of at least 750 $in^2$ using a conductive polymer composition at one or more of: at least one switch structure in the distribution system; at least one metering structure in the distribution system; at least one lightening arrestor structure in the distribution system; at least one capacitor bank structure in the distribution system; at least one relay structure in the distribution system; and, at least one automatic switch structure in the distribution system.

In one embodiment of the method of grounding integrated electrical transmission and distribution systems comprising the step of providing a ground contact area of at least 750 $in^2$ using a conductive polymer composition at one or more transformer structures in the distribution system, the one or more transformer structures comprises at least 25% of said transformer structures in the distribution system. In one embodiment of the method of grounding integrated electrical transmission and distribution systems comprising the step of providing a ground contact area of at least 750 $in^2$ using a conductive polymer composition at one or more transformer structures in the distribution system, the one or more transformer structures comprises at least 50% of said transformer structures in the distribution system. In one embodiment of the method of grounding integrated electrical transmission and distribution systems comprising the step of providing a ground contact area of at least 750 $in^2$ using a conductive polymer composition at one or more transformer structures in the distribution system, the one or more transformer structures comprises substantially all of the transformer structures in the distribution system. In one embodiment of the method of grounding integrated electrical transmission and distribution systems comprising the step of providing a ground contact area of at least 750 $in^2$ using a conductive polymer composition at one or more transformer structures in the distribution system, the one or more transformer structures comprises all of said transformer structures in the distribution system.

In one embodiment of the method of grounding integrated electrical transmission and distribution systems comprising the step of providing a ground contact area of at least 750 $in^2$ using a conductive polymer composition at one or more transformer structures in the distribution system, the method further comprises the step of providing a ground contact area of at least 750 $in^2$ using a conductive polymer composition at one or more structures in the transmission system. In one embodiment of the method of grounding integrated electrical transmission and distribution systems comprising the step of providing a ground contact area of at least 750 $in^2$ using a conductive polymer composition at one or more transformer structures in the distribution system, the method further comprises the step of providing a ground contact area of at least 750 in using a conductive polymer composition at substantially all of said structures in the transmission system.

In one embodiment of the present invention, there is a method of grounding integrated electrical transmission and distribution systems comprising the step of providing a ground contact area of at least 750 $in^2$ using a conductive polymer composition at one or more structures in the transmission system. In one embodiment, there is a method of grounding integrated electrical transmission and distribution systems comprising the step of providing a ground contact area of at least 750 $in^2$ using a conductive polymer composition at all structures in the transmission system In another embodiment of the present invention, there is a method of grounding integrated electrical transmission and distribution systems comprising the step of providing a ground contact area of at least 750 $in^2$ using a conductive polymer composition at one or more transformer structure in the distribution system, the conductive polymer composition comprising polyurethane. In one embodiment, the polymer composition comprising polyurethane is formed by combining polyisocyanate, an organic alcohol component, an asphaltic component, a liquid water-immiscible component in an amount effective to allow formation of a foam in the presence of water, a catalyst, a non-ionic surfactant, a flame retardant, and a conductive material. In one embodiment, the polymer composition is formed by combining about 30–50% 4,4'-diphenylmethane diisocyanate; about 0.01–30% of an asphaltic component; about 15–35% of amine phenolic or polyether polyol or combination of both; about 4–15% of a water-immiscible component; up to about 2% silicone glycolcopolymer; less than 1% water; up to about 1% catalyst selected from the group consisting of amine-based catalyst, tin-based catalyst, and a mixture of amine-based catalyst and tin-based catalyst; up to about 2% flame retardant and from about 1–20% of the conductive material. In one embodiment, the conductive material is selected from the group consisting of tetramethylammonium iodide (TMAI), organic salts, inorganic salts, conjugated organic compounds, carbon particles, carbon fibers, metal filings, fullerene-based materials, single wall nanotubes, multiwall nanotubes, nanotube composites, and any combination thereof.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

As used herein, "a" or "an" means one or more.

As used herein, the term "amine-based catalyst" means any catalytic compound having at least one amino function. Examples include, but are not limited to, aminophenol and triethylamine.

As used herein, "asphalt" or "asphaltic component" is defined by its customary meaning, being a solid or semisolid mixture comprising bitumens obtained from native deposits or petroleum or by-products of petroleum or petroleum related industry processes. It consists of one or more hydrocarbons of greater than about sixteen carbon atoms. As used herein, the term "asphaltic component" means a composition comprising asphalt. Non-limiting examples of a commercial "asphalt" or "asphaltic component" include ChevronPhillips H.P.O. 830 and ExxonMobil S2.

As used herein in reference to the polymer composition, the term "conductive" means having a capacity to transfer electrons through the material.

As used herein, the term "integrated electrical transmission and distribution system" refers to any electrical system in which an electrical transmission system is in contact with an electrical distribution system. "Transmission" and "distribution" have their ordinary meanings as known to one of ordinary skill in the art.

As used herein, the term "organic alcohol component" means a composition comprising a component having the formula R—$(OH)_n$ where n is at least one. Organic alcohol components can be simple alcohols or polyols.

As used herein, "TMAI" means tetramethylammonium iodide.

As used herein, the term "tin-based catalyst" means any catalytic compound having at least one tin atom. Examples include, but are not limited to, dibutyl tin and diethyl tin.

As defined herein, "water-immiscible" means that the solubility in water at about 70° F. is less than about 5 grams per 100 grams of water and preferably less than about 1 gram per 100 grams of water. The term "water-immiscible component" means any liquid material meeting the above-specified solubility requirement, but most preferably means aromatic solvents or mixtures thereof, such as those comprising toluene or xylenes, etc. A non-limiting example of a commercial "water-immiscible component" includes ExxonMobil SC150.

All percentages recited herein are percent by weight unless indicated otherwise.

Structural foundations are to transfer loads, in the case of electrical structures, from some place above the ground into the soil. This transfer of load into the soil is dependent upon the strength of the soil and the size of the area that accepts the load. In general, for a utility wood pole foundation, it has been established that the embedded area (hole) required to support a pole is 10% of the height of the structure plus an additional two feet. (60 cm). The more uniform or undisturbed the soil is at the pole/soil interface, the less deflection of the structure will occur.

Conductive polymer compositions used for grounding provides an ideal medium to transfer the load because of its total uniformity and its intimate contact with the soil. Because of these attributes, the soil is loaded uniformly and the structure will support more load with less ground line defection. The requirements for the backfilling foundations on structures supporting aerial loads makes them a prime candidate for using foam and when the backfill is electrically conductive, the foam serves two functions; supporting the structure and grounding the structure. Many of such compositions have the benefit of corrosion protection of the portion of the structure with which they contact.

Conductive polymer compositions would benefit several kinds of structures, such as wood poles, concrete poles, metal poles and fiberglass poles, etc. In addition, the combination of structure types such as those with concrete lower sections and steel upper sections would be good candidates. Another plus with the pre-cast concrete foundation is that it can be "foamed" in place as the hole is excavated, therefore eliminating the problems of needing anchor bolt alignment and rebar placement while trying to pour the concrete at the same time.

Other variations of foundation installation might include pre-casting concrete tubes with anchor bolts assemblies cast into the concrete tubes. The tube is trucked to the power line right of way and rolled to its final location. The hole is then excavated and the concrete tube is lowered into the hole, aligned and "foamed" in place with the conductive foam. The excavated spoils are then placed inside the pre-cast tube before the structure itself is attached to the pre-cast concrete tube. This method eliminates a great deal of right of way clean up.

It must be noted, that in using fiberglass and concrete embedment of any type, it would be expedient to place a ground wire into the annulus so the conductive foam can make a connection to the structure and system neutral.

Also, it may be beneficial in some cases to place a ground rod in the composition either before the composition is installed or after the composition is in place. After the composition has been installed, a ground rod may simply be driven into the composition. This greatly expands the contact area of the ground rod.

The process of producing conductive polymer composition can be realized by dispersing conductive materials compatible with the modified urethane foam system. Preferably, these materials are innately conducting. It has been found that the conductive materials disclosed herein provide continuous electrical pathways through the polymer matrices generally, and particularly through urethane foam, giving such polymer matrices properties similar to commonly used conductors.

Any number of conductive materials are applicable in the present invention. In one possible system, TMAI is homogeneously dispersed or dissolved throughout the polymer matrix, resulting in a conducting polymer. TMAI also may be used as a doping and coupling agent. Other salts are also possible, particularly those having organic moieties and possessing formal charge. Alternatively, any organic or inorganic salt which imparts conductivity to the polymer matrix is within the scope of the present invention. Neutral molecules such as some conjugated organic molecules are also useful. Alternatively or additionally, carbon particles, carbon fibers, or both carbon particles and carbon fibers may be used. An example would be a mixture (preferably 1:1, by weight) of TMAI (or other conductive material) and carbon particles and/or fibers is used. When non-dissolving or partially dissolving particles and/or fibers such as carbon particles and/or fibers are used, the imparted conductivity is optimized as the particles becomes smaller. Ideally, particles of micron-scale dimensions work best. Metals or metal alloys may also be used. Wide dispersal of the conductive material throughout the polymer matrix maximizes conductivity. For example iron, copper, or other metal filings may be used. Alternatively, steel filings may be used. It is also possible to use materials which become conducting in the presence of another material or external stimulus.

Alternatively or additionally, fullerene-based materials are preferred conductive materials in the present invention. Single wall nanotubes (SWNT), multiwall nanotubes (MWNT), and nanotube composites may be used separately or together, alone, or in combination with other conductive materials such as carbon black, carbon particles, carbon fibers, metal particles, metal alloy particles, etc. The single wall nanotubes, multiwall nanotubes, and nanotube composites may be of any purity and physical dimensions which renders the polymer composition conductive. Fullerenes, such as $C_{60}$, $C_{70}$, $C_{64}$, $C_{84}$, as well as the higher fullerenes may also be used. Also, derivatized fullerenes may be used.

Single wall nanotubes preferably have diameters ranging from approximately 0.7 to 2 nanometers. Multiwall nanotubes preferably have diameters ranging from approximately 10 to approximately 300 nm. Preferably, when single wall nanotubes are used, they at levels of from approximately 0.1–6% of the composition. Also, preferably, when the multiwall nanotubes are used, they are at levels of from approximately 1–8% of the composition. When multiwall nanotubes are used, it is preferable that approximately 80% of the multiwall nanotube have dimensions of approximately 10 to 30 nm in diameter and approximately 1 to 10 microns in length. When single wall nanotubes are used, it is preferable that approximately 30% of the single wall nanotubes have dimensions of approximately 0.7 to 1.2 nm in diameter and approximately 2 to 20 microns in length. Although specific examples have been offered in this discussion, it should be clear to one of ordinary skill in the art that any conductive material, compatible with the composition matrix can be used to enhance grounding of the equipment in question.

A wide variety of polymers are useful as the polymer matrix in the present invention. These can be polyesters, polyamides, polyolefins, as well as others. Preferably, polyurethane foam is used as the polymer matrix. Although the examples focus on polyurethane foam, it should be understood that any suitable polymer matrix loaded with conductive material is useful in the present invention.

Although any conductive polymers and conductive polymer compositions are amenable to the invention, that found to be preferred in the present invention is a polyurethane foam composition. There are standard methods known in the art for the production of polyurethane foam compositions. Polyurethane foam may be produced by reacting a polyisocyanate with a group containing active hydrogen such as a polyol. A polyisocyanate, such as OCN—R—NCO (containing the organic radical —R—) reacts with an organic alcohol molecule such as one represented by the general formula $R—(OH)_n$, where n is at least one, a low molecular weight and liquid resinous material containing a long chain organic radical —R— (polyester radical chain, for example) and having groups containing active hydrogen atoms such as the OH groups. The organic alcohol can be a simple alcohol or a polyol. The polyisocyanate serves two functions; first as a resin reactant to link two or more molecules of resin (OH—R—OH) to form a larger molecule of solid resin; and second, to react with polyisocyanate to form gaseous $CO_2$ which serves as the blowing agent causing foam formation. Illustrative examples of the polyisocyanate include polymeric diphenylmethyl diisocyanate, and others. An illustrative example of the polyol is 4,4'-diphenylmethane diisocyanate. Other specific compounds may be used in each case.

The conductive material may be introduced in any way into the final polymer matrix. Ideally, the dispersed conductive material is introduced as a homogenous solution or mixture with one or more of the individual reactants which form the polymer in-situ at the reinforcement location. Preferably, in the case of polyurethane foams, the dispersed conductive material is introduced as a homogeneous solution or a mixture of the 4,4'-diphenylmethane diisocyanate. It may also be alternatively introduced as a homogeneous solution or mixture of any of the other reactant components. Alternatively, the conductive material may be added to the fully prepared polymer at some point prior to introduction of the polymer into the reinforcement location.

The steps of dispersing the conductive material throughout the polymer composition and applying the polymer composition to the pole or the like may be performed simultaneously or sequentially. Preferably, the step of dispersing is performed before the step of applying, however, alternatively, the step of applying may be performed before the step of dispersing or the two steps may be performed simultaneously.

Doping and coupling agents may be used in the present invention to modify and/or improve performance. Non-limiting examples of these include tetramethylammonium iodide, crown ethers, and ligands. A non-limiting example of a crown ether is 18-crown-6.

The conductive material may be of any nature and the physical dimensions may vary so long as the polymer matrix is rendered conductive. Preferably, the conductive material is fine particulate material. The particles are preferably of micron-scale dimensions. However, materials of larger dimensions may be used. Carbon fiber up to 0.25 inches in length establish electrical pathways through the carbon particles which accumulate around the cell wall and tie the carbon particles together so as to establish the electrical pathway. Any dimensions are suitable so long as the addition forms a homogenous, widely dispersed mixture. The only requirement is that the addition of the conductive materials renders to the polymer matrix a conductivity greater than that of the neat polymer and greater than earth.

The conductive material should be present in an amount of about 0.1% to about 20% of the total weight of the final composition. Preferably, it should be present in a range of from about 0.1% to about 10%. Most preferably, it should be present in a range of from about 0.1% to about 7.5%. The carbon fibers are in the amount of 0.1 to 1%, preferably 0.6%.

In the general case for polyurethane foams, the composition is formed in situ by the combination of a polyisocyanate, an organic alcohol component, an asphaltic component, a liquid water-immiscible component in an amount effective to allow formation of a film of sufficient strength for holding the pole in the presence of water, a catalyst, a flame retardant, and a non-ionic surfactant. Preferably, the composition has a density of about 4 to 17 pounds per cubic feet and compression of at least about 30 PSI. By way of non-limiting example, the polyisocyanate may be 4,4'-diphenylmethane diisocyante, and the organic alcohol component may be amine phenolic or polyether polyol. The liquid water-immiscible component may be any aromatic solvent or any aromatic solvent mixture such as toluene, the various xylenes or mixtures thereof. Preferably, a mixture of xylenes is used, although other aromatic solvents may be used. A commercially available example of this component is ExxonMobil SC150. The asphaltic component may be a commercially available asphalt such as Chevron Phillips H.P.O. 830 or ExxonMobil S2. These commercial materials are merely illustrative examples and are not limiting. Non-limiting examples of the catalyst include aminophenol, and dibutyl tin; and the non-ionic surfactant may be, among others, silicon glycolcopolymer. Doping materials may be crown ethers such as 18-crown-6, and TMAI.

It is preferable to include a flame retardant component in the composition described herein. The flame retardant helps in raising the overall flash point of the material for fire and safety. It also helps in the flow ability of the material. An illustrative but non-exhaustive list of flame-retardants include TCPP (tris(1-choloro-2-propyl) phosphate); TDCPP (tris(1,3-dichloro-2-propyl) phosphate); and TCEP (tris(2-chloroethyl) phosphate). Some illustrative and non-exhaustive commercial examples include Celltech TCEP Flame Retardant, and Fyrol CEF.

The following specific example illustrates the modification of a known material with conductive carbon to provide a conductive polymer composition useful in the present invention.

The foamable compositions utilized in the present invention can vary widely with the requirements mentioned above. The following is representative of such formulations in which all parts are by weight. Note that the example contains references to specific commercial components are made, however, any equivalent of these components may be substituted therein.

| Component | Range | Preferred |
|---|---|---|
| 4,4'-diphenylmethane diisocyanate | 30–50% | 39.8% |
| Petroleum hydrocarbon Chevron Phillips H.P.O. 830 | 5–30% | 11.8% |
| Amine phenolic or polyether polyol or combination of both | 20–35% | 25% |
| Aromatic Solvent ExxonMobil SC150 | 4–15% | 12.6% |
| Silicone glycolcopolymer | 0–2% | 1.3% |
| Carbon Fiber (at least 0.25 inches long) | 0.1–1% | 0.6% |
| Water | 0–1% | 0.20% |
| Aminophenol catalyst | 0–1% | 0.33% |
| Flame Retardant | 0–2% | 1.5% |
| 1:1 Mixture of Carbon Black and TMAI | 1–20% | 7.3% |

The method of the present invention may also to improve grounding of electrical structures already in place. This method of resetting and grounding an electrical structure is accomplished by creating more surface area on an existing electrical system by excavating a trench away from the structures that are already in place. The trench should be excavated to a depth where the moisture content of the soil is constant. The width of the trench can be wide or narrow, whichever is practical to excavate depending the method used for the excavation. The polymer composition of the present invention is poured or installed in the bottom of the trench along with the copper wire that is encapsulated in the composition and connected to the pole ground and system neutral.

Another method of providing supplemental grounding on structures previously in place would be to excavate an area around the structure. Rather than replacing the removed soil, the composition material of the present invention would be installed around the excavated area and would provide additional grounding.

The composition and methods described herein can also be used in conjunction with substation ground-mats or grids. After the excavation is completed for the mat/grid and the ground-mat has been installed, 3"–6" of the composition 1 is placed over the connecting copper wire to increase the area of the grounding mat's connection with the earth.

Along the same line, temporary substations, i.e., power transformers on wheels, could best be grounded by auguring numerous holes around the transformer. Adequately sized copper wires that are connected between the temporary transformers and the holes would have conductive material poured over the copper wire that is in the hole, thus enhancing the copper wire to earth connection.

Consideration may also be made in areas of high soil resistivity when installing underground cable with the ground wire wound around the cable. (a sheath type of cable). It is beneficial to apply the conductive composition over the conductor in well-spaced intervals which will increase the grounding and also let the cable dissipate heat. This application also improves heat dissipation.

The present invention is also applicable to resetting and/or grounding other structures. In particular, buildings ranging from high-rise skyscrapers, mid-level buildings, down to one or two stories houses, etc., may be afforded enhanced foundational support and/or electrical grounding through the use of the present invention.

The composition of the present invention is well suited to electrical equipment with single-phase motors. In this way, the backfill material can perform better than a ground rod. The increased area will readily allow the unbalanced (reactive) load to connect with the distribution transformer and/or the power substation through the ground so the load can be balanced through the substation connection (Y–Δ).

An important application of the present invention is the removal of harmonics from the electrical system. The standard AC system in the U.S. operates at 60 cycles/second (Hz). Harmonics are additional cycles superimposed on the 60 Hz cycle curve. While systems outside the U.S., such as those in Europe, operate at different frequencies, the effect is similar, and the present invention is applicable. The total load comprises the basic sine wave of the expected system load plus the harmonics generated, resulting in a much larger total than the expected load. Harmonics are oftentimes caused by unbalanced loads; such as produced by single phase motors, temporary faults on the line or equipment and by the use of semiconductors, etc. Harmonics can be eliminated by directing them to the ground on a grounded “Y” of a “Y”-Delta connection at the transformer bank. This requires a strong ground at the transformer bank. As earlier mentioned, good ground is helpful when lightening strikes a utility pole. The speed of discharging a lightening strike minimizes damages to system components. Lightening strikes can be in excess of 50,000 amps, therefore a strong ground is essential to accommodate such high currents. The present invention is applicable to any and all of the aforementioned problems. The use of a conductive polymer material to ground the electrical structure improves the grounding performance of a wide variety of polymer backfill materials useful pole setting and/or resetting agents.

This same idea can be applied to reactive loads present along the electrical transmission and distribution lines. To insure that all such loads are properly accounted for, it is preferable that all ground points along the electrical transmission line are grounded with a conductive material such as that described in detail herein.

Modem loads in commercial buildings are dominated by fluorescent lights and personal computers, which cause a very high harmonic content, mainly for the third harmonic, which can increase the phase currents by 30% to 40% and in turn combine in the neutral to raise the neutral currents by 50% to 70%. The resulting problems flow on to the utility distribution system, where the losses compound all the way back to the generator unless the utility does something to eliminate the problem along the way.

The harmonics in the neutral can be eliminated or greatly reduced by grounding the neutral at the transformer that feeds the load and further reduced at each transformer or neutral ground on the return path back to the generator. A superior method of grounding can substantially reduce these problems.

Good grounds on each transmission structure that supports a static wire does a superior job of protection from the buildup of excessive voltage fluctuations on the phase as a result of a lightning strike. It has been found that the excessive current induced in the static will travel both ways from the point of strike. It has also found that after 5 to 10 grounds in each direction, current from the strike has been reduced to zero. Good grounds are additionally necessary for workmen’s safety when working on or around high voltage lines.

Electrical losses in transmission are equal to $I^2Z$ where I is current flowing and Z is the sum of the resistance and the inductance, which are properties of the physical structure. Where neutral current has been raised by 50% for this example, losses without harmonics=$(1)^2\times Z$ and losses with harmonics=$(1.5)^2\times Z$ and the Z which governs the system in the case where harmonics are removed is much less than the Z for the path all the way back to the generator.

In order to make this test, adequate grounding is needed. A heavy duty neutral ground is needed at the utility pole or other structure which supports the transformers that supply customers, particularly industrial or commercial customers. Adequate grounding, at as many poles and structures as possible, preferably at all such points along the path to the transmission substations and the power plant substations that feed the circuit we are testing.

The NESC and NEC have stated that a ¾"×8' ground rod, driven in undisturbed soil is an adequate ground. It is preferable that the grounding in the present invention be at least this good. However, lightning strikes, heavy secondary services, and requirement for larger neutrals has proven this to be wrong. A #6 wire butt wrapped on a pole is also inadequate for the changed conditions that now exist in utility systems. The ground must be able to conduct the heavy currents from the static in case of lightning to a good connection to ground without significant damage to itself and must be able to give short circuit protection to people and property in buildings with a large capacity service.

A small wire (#6) will usually handle the current for the small period of time in which the lightning current will flow, but the ground will not always dissipate the current. The ability to dissipate the current depends on the contact area of the ground wire or rod and the soil.

The contact area in square inches for common grounds are:

A butt wrapped #6 wire=75 square inches

A ⅝×8 ground rod=188 square inches

A ⅝×10 ground rod=235 square inches

A ¾×10 ground rod=282 square inches

One example of grounding material useful in the present invention is with a conductive polymer composition such as the urethane polymer composition herein described. Other grounding materials are also useful in the present invention, provided they have similar or superior conductive properties. Given the urethane polymer composition described herein, or one with comparable conductive properties, a ground contact area of 750 $in^2$ or greater is preferred in the present invention. Typically, a hole is bored out of the earth at or near the structure to be grounded, and an amount of conductive material necessary to result in a contact area of 750 $in^2$ or greater is used. Connections to the structure from the conductive material can be made with a suitable conducting connection, typically #6 copper wire may be used, but other means known to those of ordinary skill in the art are also applicable.

The proper grounding of at least one transformer structures in the distribution system is an aspect of the present invention. Additionally, the grounding of one or more other components in the distribution systems is another aspect. These include at least one primary switch structure, at least one primary metering structure, at least one lightening arrestor structure, at least one capacitor bank structure, at least one relay structure, and/or at least one automatic switch structure in the distribution system. The grounding may include the grounding of any combination of one ore more than one of these components in the distribution system.

More preferably, the grounding would comprise grounding of at least 25% of the transformer structures in the distribution system. Even more preferably, the grounding would comprise grounding of at least 50% of the transformer structures in the distribution system. Even more preferably, the grounding would comprise grounding of substantially all of the transformer structures in the distribution system. Most preferably, the grounding would comprise grounding every transformer structure in the distribution system. The system would be complemented by grounding of one or more or possibly all structures in the transmission system.

The typical system's sequence starts at the generator which has a step up transformer to transmit high voltages through the transmission system by progressing on to a substation that delivers the power to a distribution system that then reduces the voltage back down for customer consumption. All of this produces system impedance which creates the system losses. The electrical customer provides the load on the system. A consequence of additional loads that include florescent lights, computer chips and variable speed motors is the harmonic problems that we now are experiencing.

The generator has to provide for the load as well as the losses that occur on the system. If harmonics have raised the neutral current by 50%, then losses in the neutral would be $(1)^2 \times Z$ neutral without the harmonics and $(1.5)^2$ z neutral or 225% with the harmonics. If the harmonics can be eliminated within 10% of the system, then a 22.5% loss in the system without the effect of harmonics would occur in the portion near the load and the 9% of the line not affected by the harmonic losses will remain as is; for the system added to the loss for the 90% of the system that remains unchanged will give a loss of 112.5% on the corrected system.

In the absence of adequate grounding and the neutralization of the harmonics, those same losses would be 225%. The grounds that we need to provide will be placed at each transformer ground and at each pole from the load, through each substation from the load to the generator.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of grounding integrated electrical transmission and distribution systems comprising the step of providing a ground contact area of at least 750 $in^2$ using a conductive polymer composition at one or more transformer structures in the distribution system.

2. The method of claim 1 further comprising the step of providing a ground contact area of at least 750 $in^2$ using a conductive polymer composition at one or more primary switch structures in the distribution system.

3. The method of claim 1 further comprising the step of providing a ground contact area of at least 750 $in^2$ using a conductive polymer composition at one or more primary metering structures in the distribution system.

4. The method of claim 1 further comprising the step of providing a ground contact area of at least 750 $in^2$ using a conductive polymer composition at one or more lightening arrestor structures in the distribution system.

5. The method of claim 1 further comprising the step of providing a ground contact area of at least 750 $in^2$ using a conductive polymer composition at one or more capacitor bank structures in the distribution system.

6. The method of claim 1 further comprising the step of providing a ground contact area of at least 750 $in^2$ using a conductive polymer composition at one or more relay structures in the distribution system.

7. The method of claim 1 further comprising the step of providing a ground contact area of at least 750 $in^2$ using a conductive polymer composition at one or more automatic switch structures in the distribution system.

8. The method of claim 1 further comprising the step of providing a ground contact area of at least 750 $in^2$ using a conductive polymer composition at one or more of:

at least one switch structure in the distribution system;

at least one metering structure in the distribution system;

at least one lightening arrestor structure in the distribution system;

at least one capacitor bank structure in the distribution system;

at least one relay structure in the distribution system; and, at least one automatic switch structure in the distribution system.

9. The method of claim 1 wherein said at one or more transformer structures comprises at least 25% of said transformer structures in the distribution system.

10. The method of claim 9 wherein said at one or more transformer structures comprises at least 50% of said transformer structures in the distribution system.

11. The method of claim 10 wherein said at one or more transformer structures comprises substantially all of said transformer structures in the distribution system.

12. The method of claim 10 wherein said at one or more transformer structures comprises all of said transformer structures in the distribution system.

13. The method of claim 1 further comprising the step of providing a ground contact area of at least 750 $in^2$ using a conductive polymer composition at one or more structures in the transmission system.

14. The method of claim 12 further comprising the step of providing a ground contact area of at least 750 $in^2$ using a conductive polymer composition at substantially all of said structures in the transmission system.

15. The method of claim 12 further comprising the step of providing a ground contact area of at least 750 $in^2$ using a conductive polymer composition at all structures in the transmission system.

16. A method of grounding integrated electrical transmission and distribution systems comprising the step of providing a ground contact area of at least 750 $in^2$ using a conductive polymer composition at one or more structures in the transmission system.

17. The method of claim 16, wherein said one or more structures in the transmission system comprises all structures in the transmission system.

18. A method of grounding integrated electrical transmission and distribution systems comprising the step of providing a ground contact area of at least 750 $in^2$ using a conductive polymer composition at one or more transformer structure in the distribution system, said conductive polymer composition comprising polyurethane.

19. The method of claim 18 wherein said polymer composition comprising polyurethane is formed by combining polyisocyanate, an organic alcohol component, an asphaltic component, a liquid water-immiscible component in an amount effective to allow formation of a foam in the presence of water, a catalyst, a non-ionic surfactant, a flame retardant, and a conductive material.

20. The method of claim 19 wherein said polymer composition is formed by combining about 30–50% 4,4'-diphenylmethane diisocyanate; about 0.01–30% of an asphaltic component; about 15–35% of amine phenolic or polyether polyol or combination of both; about 4–15% of a water-immiscible component; up to about 2% silicone glycolcopolymer; less than 1% water; up to about 1% catalyst selected from the group consisting of amine-based catalyst, tin-based catalyst, and a mixture of amine-based catalyst and tin-based catalyst; up to about 2% flame retardant and from about 1–20% of the conductive material.

21. The method of claim 19 wherein said conductive material is selected from the group consisting of TMAI, organic salts, inorganic salts, conjugated organic compounds, carbon particles, carbon fibers, metal filings, fullerene-based materials, single wall nanotubes, multiwall nanotubes, nanotube composites, and any combination thereof.

* * * * *